UNITED STATES PATENT OFFICE.

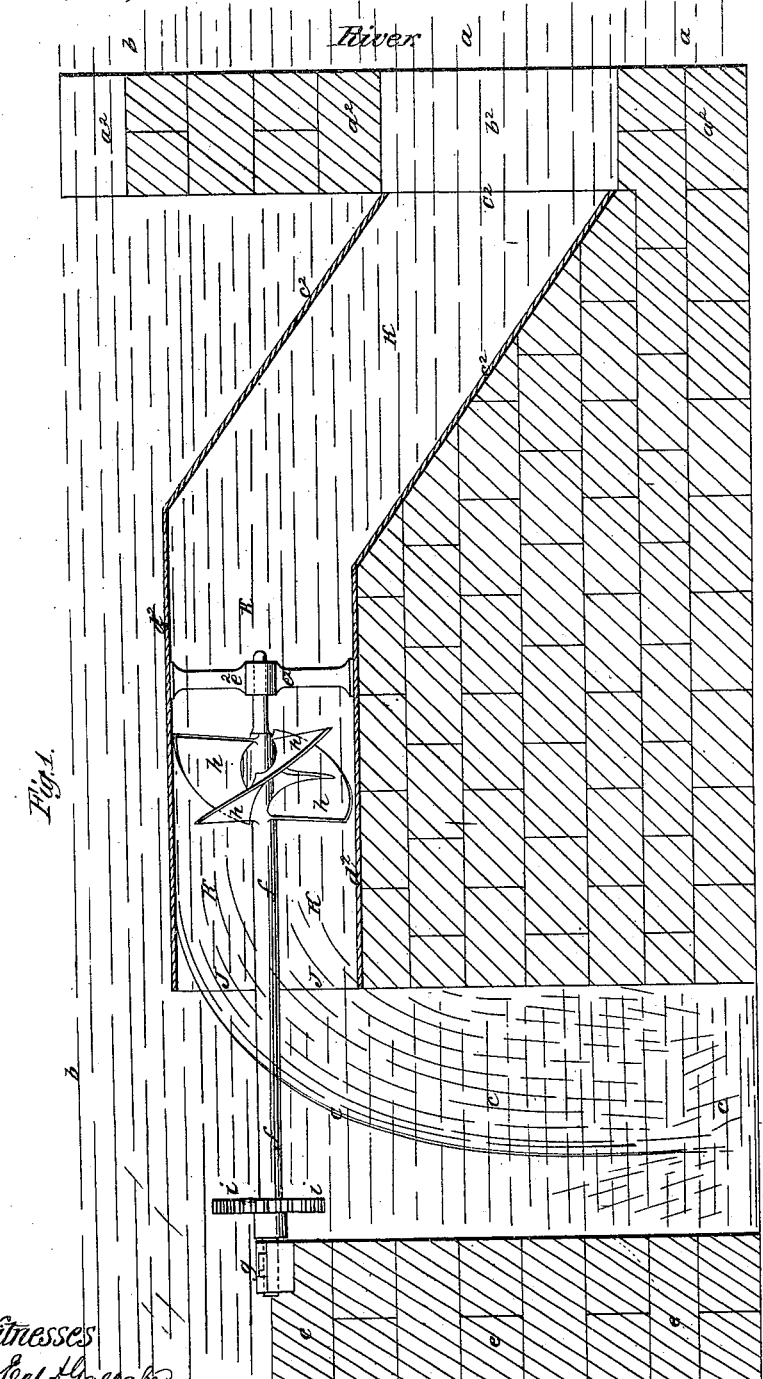
N. Colver,
Draining Pump,
Nº 38,811.                    Patented June 9, 1863.
Witnesses
Ed. F. Gallaher.
John S. Gallaher, Junior.
Inventor.
Nathaniel Colver.

NATHANIEL COLVER, OF CHICAGO, ILLINOIS.

IMPROVEMENT IN APPARATUS FOR RAISING WATER.

Specification forming part of Letters Patent No. 38,811, dated June 9, 1863.

*To all whom it may concern:*

Be it known that I, NATHANIEL COLVER, a resident of the city of Chicago, in the county of Cook and State of Illinois, have invented and made certain new and useful improvements in draining rivers, swamps, ponds, and stagnant bodies of water; and I do hereby declare that the following is a full, clear, and exact description thereof, reference being had to the accompanying drawing, making a part of this specification, in which—

Figure 1 is a vertical sectional view of the construction and mode of applying my improvements, the nature of which consists in so tapping the beds or basins of sluggish rivers and other bodies of water in such a manner as to draw off and divest them of their stagnant, fetid, and miasmatic volumes, and to introduce instead columns of fresh, running water, in a manner more fully described hereinafter.

My improvements are particularly applicable to localities where there are deposits of "back-water" from lakes or rivers upon low or flat lands where the same level exists and no effluxion or natural current is afforded to pass off their volumes and exhaust the increasing deposits of injurious matter, which generally occur in the vicinity of cities or towns having sewerage-discharges leading and emptying into basins, canals, or reservoirs. For instance, in such peculiar locations as the city of Chicago, Illinois, of late years the surrounding waters forming the Chicago River have become so sluggish and vitiated by accumulating matter and so pestilential in their evaporations as to be a source of considerable alarm and no little interest to the inhabitants of the immediate location referred to, because of the increasing annual mortality, originating, as is supposed, from the causes stated.

Many plans have been proposed to drain the Chicago waters, but heretofore none have been deemed sufficiently practicable; but from actual experiments with my mode of draining it is believed what is so much desired can now be readily and cheaply accomplished.

The better to enable others to construct and employ my improvements, I herewith describe the same, as follows, viz:

As illustrative thereof, in Fig. 1, at $a\ a$ is indicated the bed of the river, and at $b$ is indicated the water or surface line; $a^2\ a^2\ a^2$, the wall or border of the river. At $c\ c$ is indicated a body of fresh or pure water communicating with and backing up into the river through a natural connection. (Not deemed necessary to be represented.) The water line or surface $b$ of the larger body of water is in the same plane with that of the back-water or river $a\ a\ a$.

In order to carry off the sluggish and stagnant volume and substitute a sufficient quantity of pure moving water at a proper distance and convenient point on either side of the inlet of back-water, I construct a canal of from eight to ten feet in diameter and from six to eight inches below the water-line and surface of earth through which this canal or duct passes, the length of which must lie in a plane and the outlet end communicating with the body of pure water $c\ c$, while toward the end communicating with the stagnant body of water the canal or duct must depress slopingly downward at a gradual inclination, and must tap or enter the wall or bed of the river several feet (more or less) below the water line or surface. Within this canal or duct-passage is formed a water-tight cylindrical conduit-pipe, $c^2\ c^2\ c^2\ d^2\ d^2$, of stone, brick, or metal, about seven to eight feet (more or less) in internal diameter, and within which is affixed securely an upright metal stud or standard, $e^2\ e^2$, formed with a suitable journal or axle socket.

At $e\ e$ is indicated a stone or other substantial superstructure, upon the top of which is affixed securely a journal-box, $g$; and at $ff$ is indicated a horizontally-arranged suitable iron shaft, to one end of which is affixed securely any required number of spiral shaped blades, $h\ h\ h\ h$, forming a sort of screw, as represented, said blades extending outwardly from the shaft $ff$ to within a very short distance of the side of the conduit-pipe $d^2\ d^2$, so as to admit of rotating therein.

At $i\ i$ is indicated a gear pinion-wheel, to be connected as desired to other gear-wheel machinery designed to drive the screw-shaft $ff\ h\ h\ h\ h$, the journal ends of which work, respectively, in the box $g$ and socket $e\ e$.

In order to remove the stagnant water from the river $a\ a\ a$, the conduit or duct $c^2\ c^2\ d^2\ d^2$, as is represented, forms the artificial course connecting the river $a\ a\ a$ with the lake or body of pure water $c\ c$; and as the inclined end $c^2\ c^2$ enters the river-bed at several feet below the water-line surface $b$, consequently there is a greater density or hydrostatic pressure upon the flow of water entering the depressed or inclined end $c^2$ $c^2$, while the exit end J J of the conduit or duct is several feet above the line of ingress $b^2$, thus elevating the outflow and emptying it nearer the surface of the lake or body of pure water $c$ $c$.

The operation of my improvements is as follows, viz: Steam or wind motive power being connected with suitable mechanism to drive the shaft $f$ $f$, the horizontal screw of spiral blades is put in motion at any required velocity, and, being incased in the duct $c^2$ $c^2$ $d^2$ $d^2$, and submerged in the column of water $k$ $k$ $k$ $k$, in the act of revolving, sucks or draws out the stagnant water from the bed or basin of the river $a$ $a$ $a$ and empties it out into the lake or body of pure water $c$ $c$, while through the natural connection of back-water (which, however, is not represented in the drawing) a column of fresh water rushes or flows in to take the place of the impure water displaced and drawn off through the agency of the screw $h$ $h$ $h$ $h$, and by this means the sluggish deposit is caused to move and change its properties in a measure by agitation and artificial flowing, for as fast as the sluggish water is drawn off fresh moving back-water rushes in to supply the place. It will be necessary, however, to locate the exit of the duct at a suitable remote distance beyond the natural inlet of back-water, so as to distribute and prevent the impure deposits from returning.

My improvements can also be applied to ponds and basin localities where there is no back-water.

Having fully described the nature, construction, and application of my improvements, what I claim as new, and desire to have secured by Letters Patent of the United States, is—

The arrangement of the screw $h$ $h$ within a conduit, $c^2$ $d^2$, whose inlet is placed in a plane lower than that of its exit-passage, when applied for the purpose of displacing and drawing off stagnant and sluggish waters and causing an artificial inflow of pure water, substantially in the manner and for the purposes herein set forth and described.

NATHANIEL COLVER. [L. S.]

Witnesses:
  DANL. ROWLAND,
  JOHN S. GALLAHER, Jr.